US012621560B2

(12) United States Patent
Tirla

(10) Patent No.: US 12,621,560 B2
(45) Date of Patent: May 5, 2026

(54) METHOD FOR OPERATING A VEHICLE INTERIOR MONITORING SYSTEM, CONTROL DEVICE, VEHICLE INTERIOR MONITORING SYSTEM AND VEHICLE

(71) Applicant: CARIAD SE, Wolfsburg (DE)

(72) Inventor: Octavian Tirla, Berlin (DE)

(73) Assignee: Cariad SE, Wolfsburg (DE)

( * ) Notice: Subject to any disclaimer, the term of this patent is extended or adjusted under 35 U.S.C. 154(b) by 74 days.

(21) Appl. No.: 18/323,167

(22) Filed: May 24, 2023

(65) Prior Publication Data

US 2023/0388626 A1     Nov. 30, 2023

(30) Foreign Application Priority Data

May 25, 2022    (DE) .......................... 102022113271.4

(51) Int. Cl.
*H04N 23/60* (2023.01)
*G06V 10/12* (2022.01)
*G06V 10/70* (2022.01)
*G06V 10/80* (2022.01)
*G06V 20/59* (2022.01)

(52) U.S. Cl.
CPC ............. *H04N 23/64* (2023.01); *G06V 10/12* (2022.01); *G06V 10/803* (2022.01); *G06V 10/87* (2022.01); *G06V 20/59* (2022.01)

(58) Field of Classification Search
CPC ... G06T 7/80; G06T 7/97; G06T 2207/20221; H04N 23/45; H04N 23/60–62; H04N 23/66–662; H04N 23/13; H04N 23/90;

H04N 23/64; H04N 23/73; B60R 1/29; B60R 25/31; B60R 2300/8006; B60R 2300/105; B60R 2300/30;
(Continued)

(56) References Cited

U.S. PATENT DOCUMENTS 7,245,741 B1 * 7/2007 Ertl ................... B60R 21/01538
180/277
10,122,943 B1 * 11/2018 Chen ...................... H04N 23/45
(Continued)

FOREIGN PATENT DOCUMENTS

WO        2020/161610 A2     8/2020

*Primary Examiner* — Michael E Teitelbaum
*Assistant Examiner* — Human M Satti
(74) *Attorney, Agent, or Firm* — Seed Intellectual Property Law Group LLP

(57) ABSTRACT

The disclosure relates to a method for operating a vehicle interior monitoring system including at least one camera unit. A control device sets an adjustable camera parameter of the camera unit by a camera-specific control command in the camera unit and receives and evaluates at least one image recorded by the camera unit, and a result of the evaluation is output as a camera-specific result datum. The control device generates a general control command that sets the adjustable camera parameter of the camera unit, the general control command is converted based on a camera configuration of the camera unit saved in the control device into the camera-specific control command, the camera-specific result datum is converted based on the camera configuration of the camera unit saved in the control device into a general result datum, and the general result datum of the camera unit is provided to a data fusion device.

10 Claims, 4 Drawing Sheets

(58) Field of Classification Search
    CPC  B60R 2300/304; G06V 10/12; G06V 10/803;
                 G06V 10/87; G06V 20/59; G06V 10/22
    See application file for complete search history.

(56)                    References Cited

U.S. PATENT DOCUMENTS

| | | | | |
|---|---|---|---|---|
| 2006/0187305 | A1* | 8/2006 | Trivedi | G06T 3/047 |
| | | | | 348/169 |
| 2014/0022399 | A1 | 1/2014 | Rashid | |
| 2014/0078315 | A1* | 3/2014 | Carlsson | H04N 23/60 |
| | | | | 348/187 |
| 2019/0191079 | A1* | 6/2019 | Mehta | H04N 23/617 |
| 2020/0143560 | A1 | 5/2020 | Lu et al. | |
| 2022/0126864 | A1* | 4/2022 | Moustafa | B60W 50/14 |
| 2022/0130109 | A1* | 4/2022 | Arbabian | G08B 23/00 |
| 2022/0326763 | A1* | 10/2022 | Rekow | G06F 3/012 |
| 2023/0230359 | A1* | 7/2023 | Petrov | G06V 20/59 |
| | | | | 345/419 |

* cited by examiner

METHOD FOR OPERATING A VEHICLE INTERIOR MONITORING SYSTEM, CONTROL DEVICE, VEHICLE INTERIOR MONITORING SYSTEM AND VEHICLE

BACKGROUND

Technical Field

The disclosure relates to a method for operating a vehicle interior monitoring system, a control device, a vehicle interior monitoring system, and a vehicle.

Description of the Related Art

Vehicles have vehicle interior monitoring systems which are adapted to monitor a vehicle interior and persons present in a vehicle interior. Thanks to the monitoring, it is possible to ascertain the presence and/or position of a passenger. With vehicle interior monitoring systems it is possible, for example, to detect the viewing direction of a driver or gestures of a passenger. Vehicle interior monitoring systems of the prior art usually comprise two camera units, which monitor respective detection regions of the vehicle interior. The camera units take single or multiple consecutive images of the respective detection region and provide these to a control device for evaluation, which carries out the desired evaluations of the images.

The evaluation of the recorded images and the actuation of the respective camera units by the vehicle interior monitoring systems needs to be adapted to the respective camera units. It is necessary to program the control device of the vehicle interior monitoring system so that it can actuate the respective camera units in order to optimize camera parameters and thus ensure a recording of images which fulfill the image settings of a particular evaluation algorithm. Since the camera units and/or their camera drivers may differ from each other, the corresponding algorithms must be adapted to the particular camera units and/or their camera drivers. This means that the corresponding development expense increases with the many kinds of camera units used, since there is no unified and universal actuation of the camera units.

The evaluation algorithms which are used to evaluate the images provided by the camera units must likewise be adapted to the camera parameters of the camera unit, such as the resolution or the place of installation of the camera unit in the vehicle interior. When combining measurement data based on images of respective camera units, the individual properties of the camera units must be taken into consideration.

Given the anticipated increase in camera units in vehicle interior monitoring systems and an increase in variants of camera units and arrangements of the camera units in the vehicle interiors, the problem arises that extensive adaptations are required in the software in order to ensure an operation of a vehicle interior monitoring system.

WO 2020/161610 A2 describes a monitoring of a vehicle compartment with a single 2D-camera and an adapted use of monitoring algorithms. It is proposed to select a monitoring algorithm from a list of monitoring algorithms based on the condition of a passenger as determined on the basis of a first set of images of an image sequence of the vehicle compartment. The monitoring algorithm is applied to a second set of images of the image sequence, the second set of images containing images which follow upon the first set of images, in order to make possible a monitoring of the vehicle.

US 2020/0143560 A1 describes a driver monitoring system having a lighting source, emitting invisible light which illuminates at least one portion of the driver of the vehicle, a reflector arranged on the vehicle and within the line of sight of the illuminated portion of the driver, and a camera which is arranged in the vehicle and has a visual field encompassing the reflector, and a controller with an image processor, which processes the image data recorded by the camera.

BRIEF SUMMARY

Embodiments of the disclosure provide a solution making possible a reduced expense for the adapting of a vehicle interior monitoring to different systems.

A first aspect of the disclosure relates to a method for operating a vehicle interior monitoring system. The vehicle interior monitoring system comprises at least one camera unit, which is provided for the monitoring of one particular monitoring region in the vehicle interior. The method is carried out by a control device of the vehicle interior monitoring.

In a first step of the method, the control device sets an adjustable camera parameter of the camera unit by way of at least one camera-specific control command in the camera unit, in order to adapt the image recording to record at least one image by the camera unit according to image settings of a selected evaluation algorithm. The recording of the at least one image can also involve a recording of a sequence of images. In other words, the at least one camera unit is actuated by the control device. Thanks to the actuation of the camera unit, the at least one adjustable camera parameter of the camera unit is adapted. The at least one adjustable camera parameter can be, for example, an adjustable exposure time when recording the image, an image region to be recorded when taking the picture, or the color setting. The setting of the at least one adjustable camera parameter is done by way of the at least one camera-specific control command. The camera-specific control command can be dictated in particular by the respective camera unit for adapting the at least one adjustable camera parameter. The camera-specific control command may depend on the model type of the camera unit and/or a camera driver for operating the camera unit. The at least one adjustable camera parameter is adapted by the control device such that the picture which is taken by the camera unit during the image recording fulfills the image settings for the picture. The image settings can dictate, for example, the required brightness, the required contrast value, or a definite image region. The image settings depend on a selected evaluation algorithm. The selected evaluation algorithm can be, for example, an evaluation algorithm for detecting movement and/or a viewing direction of a driver. By adapting the at least one adjustable camera parameter with the control device, it is ensured that at least one picture taken by the camera unit will fulfill the image settings dictated by the selected evaluation algorithm.

In a second step, the at least one picture taken by the camera unit is received by the control device. The picture is evaluated by the control device using the selected evaluation algorithm, and a result of the evaluation is put out as a camera-specific result datum. In other words, the evaluation of the image by the control device is performed as specified by the selected evaluation algorithm. The evaluation algorithm may involve a method of computer-based vision. For example, a viewing direction of the driver can be determined in the at least one picture taken, or pixels can be registered.

The result of the evaluation is put out as a camera-specific result datum. The result datum may depend on the particular camera unit. For example, it may be provided that pixels registered are put out in image coordinates, which may depend on the orientation of the camera unit in the vehicle interior monitoring.

It is provided that the control device generates a general control command to set the adjustable camera parameter of the camera unit according to the image settings of the selected evaluation algorithm by a predetermined adaptation algorithm. The general control command differs from the camera-specific control command in that it is not camera-specific. The general control command may relate in particular to a reference system provided for the adaptation algorithm and be provided merely for further internal processing by the control device. In other words, it is provided that the control device generates the general control command in order to set the adjustable camera parameter of the camera unit so that the image settings of the selected evaluation algorithm are fulfilled. The generating of the general control command can be done by the control device according to the predetermined adaptation algorithm. The predetermined adaptation algorithm can determine the general control command for example based on general camera data or based on a picture previously taken by the camera unit. For example, it can be provided that the image settings of the selected evaluation algorithm dictate a certain contrast value. The evaluation algorithm can determine, for example based on a picture already taken, which exposure time must be set as the adjustable camera parameter by the camera unit in order to fulfill the image settings. The general control command can describe an adaptation of the adjustable camera parameter in a general system. The general system can involve predetermined numbers of steps. The general control command is described for adapting the adjustable camera parameter according to the reference system. Because the general control command does not depend on the camera unit being actuated, there is the benefit that the adaptation algorithm does not need to be adapted to the capabilities or the camera-specific control commands of the particular camera units.

In a further step, it is provided that the general control command is converted by the control device into the camera-specific control command depending on a camera configuration of the particular camera unit stored in the control device according to a predetermined converting method. In other words, the general control command is not intended for direct actuation of the particular camera unit by the control device.

In order to make possible the adaptation of the adjustable camera parameter in the particular camera units, it is therefore necessary to convert the general control command into the camera-specific control command. In order to make the converting possible, a particular camera configuration is stored for each of the camera units in the control device. They may involve, for example, a dictionary for translating general control commands into camera-specific control commands. The particular camera configuration may also contain specifications for the conversion of values or permissible value ranges which can be set in the camera unit. The camera configuration of the particular camera unit is read out in the predetermined converting method in order to convert the general control command into the camera-specific control command.

In a further step, it is provided that the camera-specific result datum is converted into a general result datum, depending on the camera configuration of the camera unit stored in the control device, by a predetermined generalization method. In other words, the camera-specific result datum is put out by the camera unit, and it depends on the camera unit itself.

For example, a detected movement can be referenced to the camera unit. But in order for the result datum to be further evaluated and fused for example with the data of other camera units, it is necessary to convert this into a general result datum, one which is independent of the particular camera unit. For example, it can be provided that detected movements of coordinates, referenced to the camera unit, will be transformed into coordinates referenced to a reference point in the vehicle interior.

The general result datum of the camera unit is then provided by the control device to a data fusion device. The data fusion device can be adapted to merge the general result data from different camera units.

One modification of the disclosure calls for the vehicle interior monitoring system to comprise at least two camera units. In other words, it is proposed that the method is performed by the control device on a vehicle interior monitoring system, which has at least two camera units for monitoring of respective monitoring regions in the vehicle interior. This modification affords the benefit that general result data can be provided from at least two camera units to the data fusion device.

One modification of the disclosure calls for the selected evaluation algorithm to be chosen in dependence on the camera configuration. In other words, the selected evaluation algorithm is chosen from among multiple evaluation algorithms in dependence on the camera configuration of the particular camera unit. For example, it can be provided that a certain evaluation can be performed by different evaluation algorithms. It may happen that the evaluation algorithms differ from each other, and the evaluation algorithms can be optimized for particular camera parameters. For example, it can be provided that the evaluation algorithms can be optimized for different contrast values and/or resolutions. The control device can then select the evaluation algorithm which is best suited to the parameters stored in the camera configuration. This affords the benefit that an evaluation algorithm to be performed can be determined by the control device with the aid of the camera configuration.

One modification of the disclosure calls for combining the respective general result data of the at least two camera units by the data fusion device according to a predetermined data fusion method to form one fusion datum. In other words, the general result data coming from the at least two camera units are fused by the data fusion device according to the predetermined data fusion method, in order to generate a fusion datum. For example, it can be provided that the respective general result data contain movements captured by the respective camera units and the movements captured by the respective camera units are fused by the data fusion device to generate a fusion datum, describing a three-dimensional movement.

One modification of the disclosure calls for at least one camera parameter of the camera unit to be retrieved by the control device from the camera unit and stored in the camera configuration. In other words, it is provided that the at least one configuration parameter is read out from the camera unit by the control device. The configuration parameter can describe, for example, the resolution of the camera unit. The control device saves the at least one configuration parameter which has been read out in the camera configuration. This affords the benefit that the at least one configuration parameter of the camera unit does not have to be manually stored in the control device. One modification of the disclosure calls for the camera configuration to include a position of the particular camera unit in the vehicle interior. In other words, the position of the respective camera units is stored as a configuration parameter of the respective camera unit in the respective camera configuration.

One modification of the disclosure calls for assigning respective weighting values by the control device to the respective general result data of the at least two camera units in dependence on the respective camera configurations. The weighting values are provided to the data fusion device by the control device together with the general result data. The general result data are combined, in dependence on the respective weighting values, according to the predetermined data fusion method, to form the fusion datum. In other words, it is provided that the fusing of the general result data is done by the data fusion device, the general result data of the respective camera units being given different weights, and the weighting of the general result data of the respective camera units is done in dependence on the respective weighting values. The respective weighting values are assigned by the control device to the respective camera units in dependence on the respective camera configurations and are sent together with the general result data of the data fusion device to the data fusion device. The weighting values can describe for example an accuracy or reliability of the general result data produced from the images of the respective camera units. For example, it can be provided that higher weighting values will be assigned to a camera unit having a higher resolution than another one of the camera units than to the camera unit with the lower resolution. During the fusion of the general result data of the respective camera units, the weighting by the data fusion device can be used to give greater consideration to the result data of a more reliable camera unit, for example if the result data are different.

For application instances or application situations which might arise during the method and which are not described explicitly here, it can be provided that an error message and/or a prompt to enter a user feedback will be put out according to the method, and/or a standard setting and/or a predetermined initial state will be established.

A second aspect of the disclosure relates to a control device for a vehicle interior monitoring system. The control device is adapted to set an adjustable camera parameter of at least one camera unit of the vehicle interior monitoring system by way of at least one camera-specific control command in the camera unit, in order to adapt the image recording to record at least one image by the camera unit according to image settings of a selected evaluation algorithm. The control device is adapted to receive the at least one image recorded by the camera unit and evaluate it according to the selected evaluation algorithm. The control device is adapted to put out the result of the evaluation as a camera-specific result datum. It is provided that at least one general control command is generated to set the adjustable camera parameter of the camera unit according to the image settings of the selected evaluation algorithm by a predetermined adaptation algorithm. The control device is adapted to convert the general control command depending on a camera configuration of the camera unit stored in the control device into the camera-specific control command by a predetermined converting method. The control device is adapted to convert the camera-specific result datum depending on the camera configuration of the camera unit stored in the control device to a general result datum by a predetermined generalization method. The control device is adapted to provide the general result datum of the camera unit to a data fusion device.

The control device can comprise a data processing device or a processor device which is adapted to carry out one embodiment of the method according to the disclosure. For this, the processor device can have at least one microprocessor and/or at least one microcontroller and/or at least one FPGA (Field Programmable Gate Array) and/or at least one DSP (Digital Signal Processor). Moreover, the processor device can contain program code which is adapted to carry out one embodiment of the method according to the disclosure. The program code can be saved in a data storage of the processor device.

A third aspect of the disclosure relates to a vehicle interior monitoring system comprising the control device according to the second aspect of the disclosure. The vehicle interior monitoring system comprises at least one camera unit, which is adapted to monitor a particular monitoring region in a vehicle interior.

A fourth aspect of the disclosure relates to a vehicle comprising the vehicle interior monitoring system according to the third aspect of the disclosure.

The vehicle according to the disclosure is preferably designed as a motor vehicle, especially a passenger car or truck, or as a passenger bus or motorcycle.

The disclosure also includes modifications of the control device according to the disclosure, the vehicle interior monitoring system according to the disclosure, and the vehicle according to the disclosure having features as were already described in connection with the modifications of the method according to the disclosure. For this reason, the corresponding modifications of the control device according to the disclosure, the vehicle interior monitoring system according to the disclosure, and the vehicle according to the disclosure will not be further described here.

As a further solution, the disclosure also encompasses a computer-readable storage medium, containing commands which when executed by a computer or a group of computers cause it or them to carry out one embodiment of the method according to the disclosure. The storage medium can be configured, e.g., at least partly as a nonvolatile data storage (such as a flash memory and/or an SSD—solid state drive) and/or at least partly as a volatile data storage (such as a RAM—random access memory). The computer or group of computers can provide a processor circuitry having at least one microprocessor. The commands can be provided as binary code or Assembler and/or as source code of a programming language (such as C).

The disclosure also encompasses the combinations of the features of the described embodiments. The disclosure thus also includes realizations having a combination of the features of several of the described embodiments, as long as the embodiments were not described as being mutually exclusive.

BRIEF DESCRIPTION OF THE SEVERAL VIEWS OF THE DRAWINGS

In the following, exemplary embodiments of the disclosure are described.

DETAILED DESCRIPTION

The following explained exemplary embodiments involve advantageous embodiments of the disclosure. In the exemplary embodiments, the described components of the embodiments each time represent individual features of the disclosure, to be viewed independently of each other, which modify the disclosure also independently of each other. Therefore, the disclosure will encompass also other than the represented combinations of features of the embodiments. Moreover, the described embodiments can also be supplemented with other of the features of the disclosure already described.

In the figures, the same reference numbers each time refer to functionally identical elements.

Figure 1:
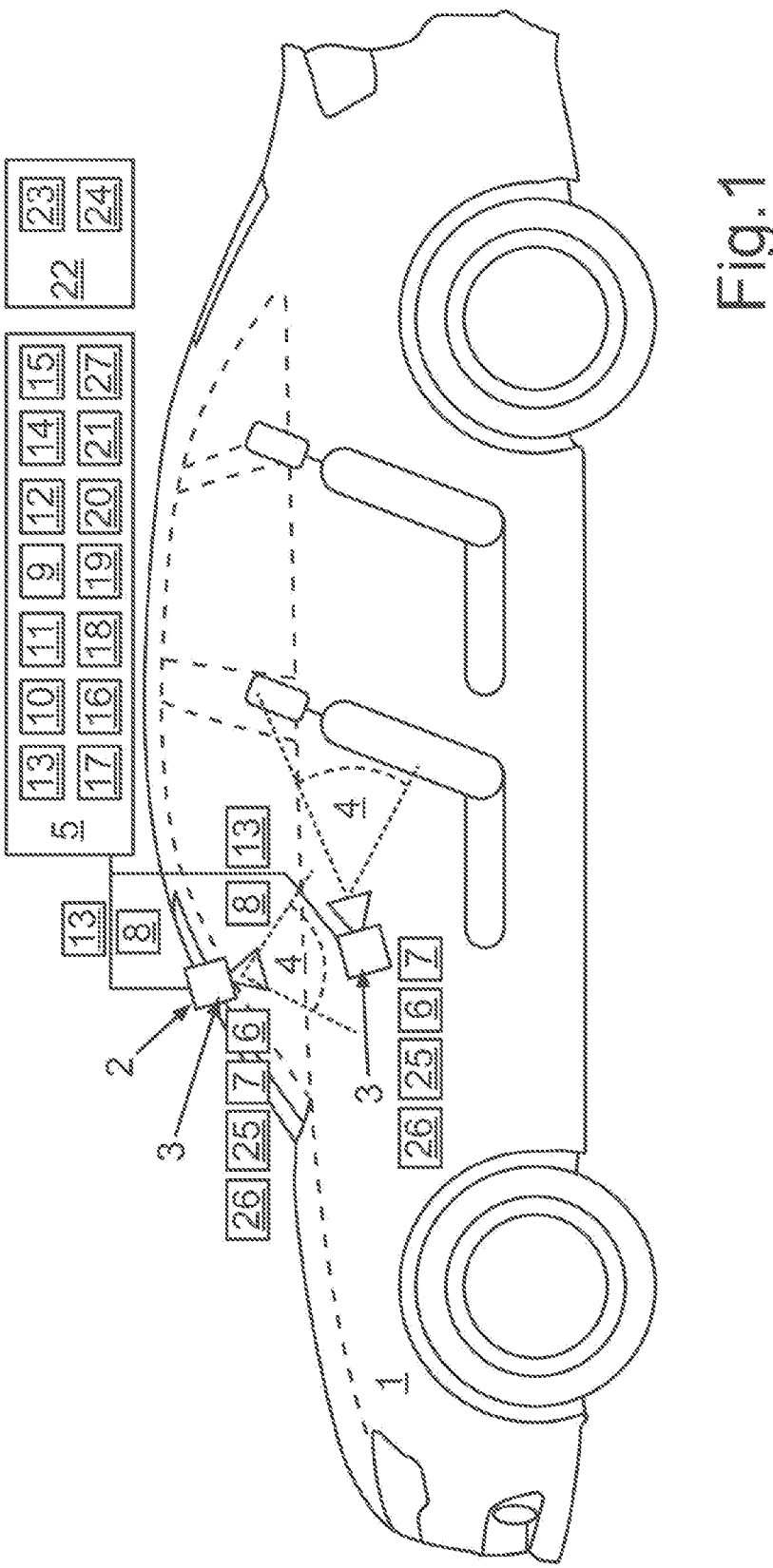
FIG. 1 shows a schematic representation of a vehicle having a vehicle interior monitoring system.

FIG. 1 shows a schematic representation of a vehicle having a vehicle interior monitoring system.

The vehicle interior monitoring system 2 can comprise multiple camera units 3, which can be adapted to monitor respective monitoring regions 4 within a vehicle compartment. A camera unit 3 can have a respective monitoring region 4. The vehicle interior monitoring system 2 can have a control device 5, which can be adapted to actuate the respective camera units 3. A respective camera unit 3 can comprise a respective camera driver 6 and have camera parameters 7, 25, which can be fixed or adjustable. The control device 5 can relay camera-specific control commands 8 to the respective camera units 3 in order to adapt adjustable camera parameters 7 such that a picture 13 taken fulfills predetermined image settings 9, 10. The respective image settings 9, can depend on a selected evaluation algorithm 12 among multiple possible evaluation algorithms. The image settings 9, 10 for example can specify predetermined brightness values or contrast values. In this way, it can be assured that the picture 13 taken fulfills the image settings 9, 10 in order to allow an evaluation of the picture 13 by the selected evaluation algorithm 12. The selected evaluation algorithm 12 can be, for example, an algorithm for recognition of a movement or a viewing direction in the picture 13 taken. The selected evaluation algorithm 12 can put out the result as a camera-specific result datum 14. The control device 5 is designed such that it can equalize differences between camera units 3 which are due for example to different camera drivers 6. For example, it can be possible for the control device 5 to generate the camera-specific control command 8 from a general control command 15, where the general control command 15 can be a predetermined adaptation algorithm 16, 17 from among multiple adaptation algorithms. The general control command 15 can be non-camera-specific and it can specify a given adaptation value for the respective camera unit 3. The adaptation algorithm 16, 17 can put out the general control command independently of the properties of the respective camera unit 3. Thus, it is not necessary to adapt the evaluation algorithm to the respective camera units 3 or the respective camera drivers 6. The adapting of the general control command 15 to a camera-specific control command 8 can be done in dependence on a respective memorized camera configuration 18 by way of a predetermined converting method 19. The converting method 19 can involve tables, for example, which can match up general control commands 15 with the particular camera-specific control command 8. In order to avoid an adapting of the respective evaluation algorithms to the respective camera units 3, the control device 5 is adapted to carry out predetermined generalization methods 20. The predetermined generalization method 20 can be adapted to convert the respective camera-specific result data 14, which may describe for example coordinates of a detected movement in relation to the position 26 of the camera unit 3, to the general result datum 21, which is independent of the respective camera unit 3. Advantageously, the general result datum 14, 21 can be supplied to a data fusion device 22, which can convert the general result data 14, 21 by a predetermined data fusion method 23 into a fusion datum 24. It may be possible for the camera units 3 to differ in their precision from each other. In order to take this into account during the fusion of the respective general result data 21, it can be provided that a respective weighting value 27 is associated with the respective general result data 21 in dependence on the respective camera configurations 18. The weighting value 27 can be taken into account by the data fusion device 22 when performing the predetermined data fusion method 23.

Figure 2:
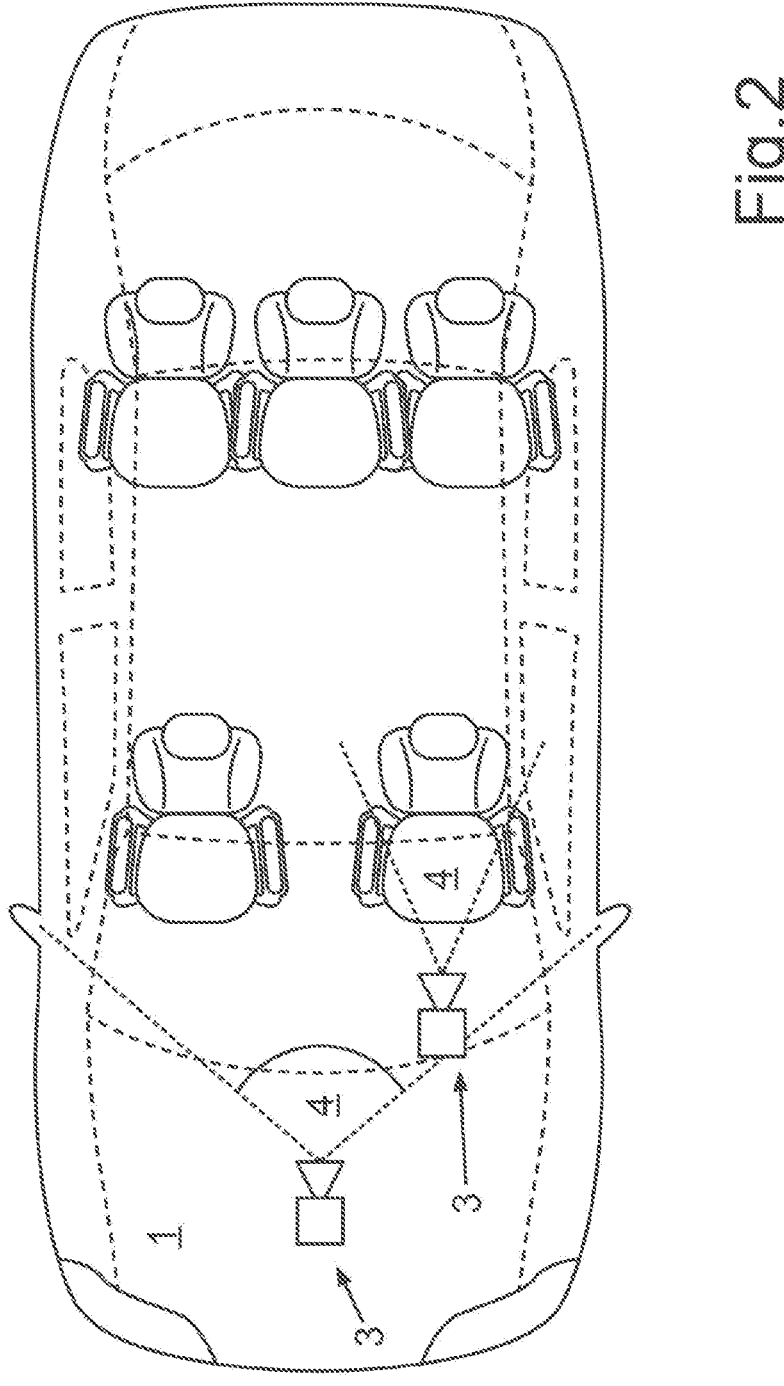
FIG. 2 shows a further schematic representation of a vehicle having a vehicle interior monitoring system.

FIG. 2 shows a further schematic representation of a vehicle 1 having a vehicle interior monitoring system 2.

Figure 3:
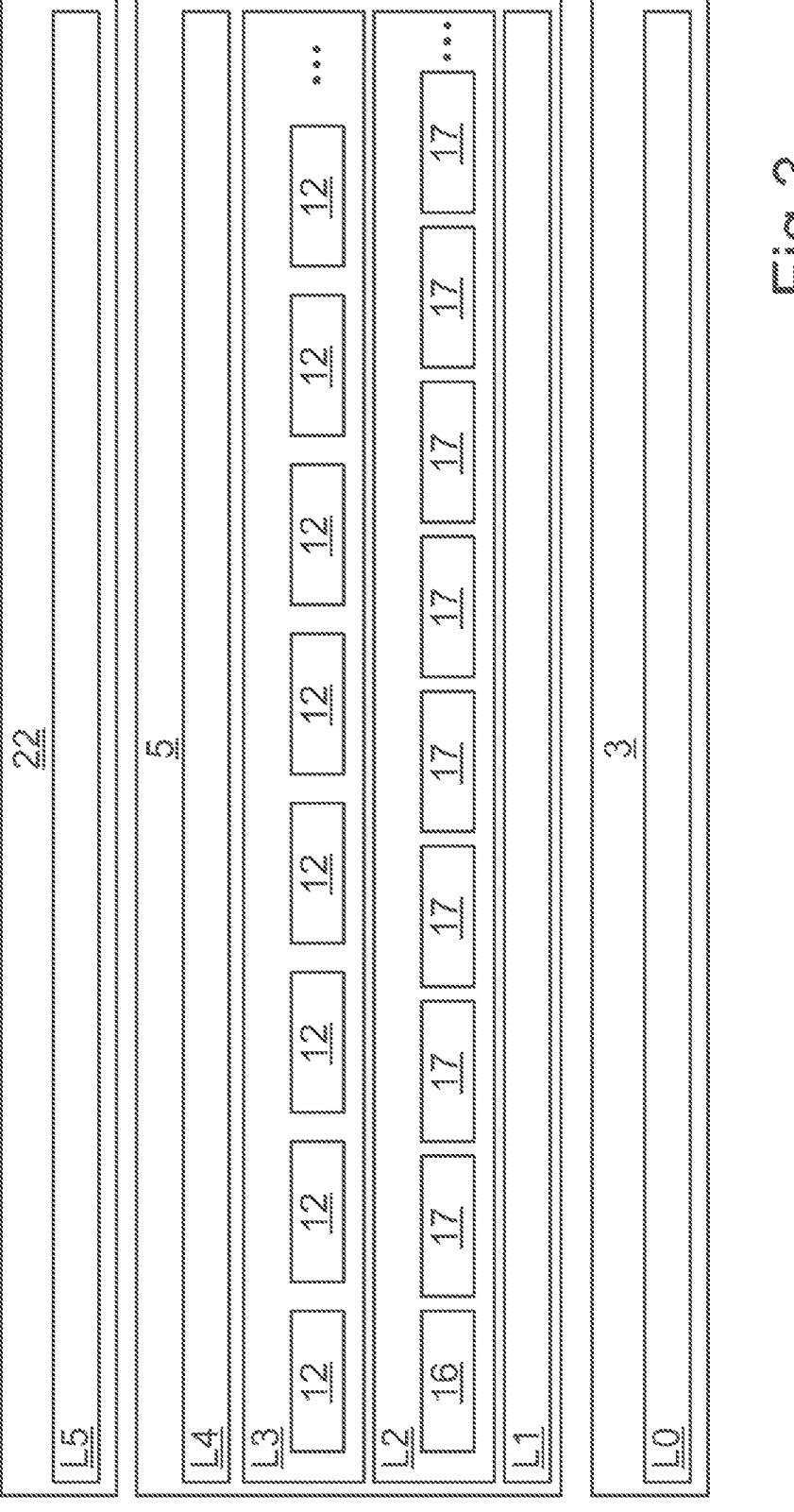
FIG. 3 shows a schematic representation of different layers for carrying out the method by the control device.

FIG. 3 shows a schematic representation of different layers to carry out the method by the control device 5.

A camera driver layer L0 at one end of multiple layers can comprise the respective camera driver 6, which can operate the camera units 3. The respective camera units 3 and their camera drivers 6 can differ from each other, so that it may be necessary to relay respective camera-specific control commands 8 to the respective camera drivers 6 in order to actuate the respective camera units 3. Furthermore, fixed camera parameters 25 and variable camera parameters 7 of the respective camera units 3 may differ from each other. To avoid having to adapt the respective evaluation algorithms 11, 12 and the respective adaptation algorithms 16, 17 to the respective camera units 3, it can be provided to have predetermined layers which can deal with the adaptation to the respective camera units 3.

For example, it can be provided to arrange a camera abstraction layer L1 between an adaptation layer L2, comprising the adaptation algorithms 16, and the camera driver layer L0. The camera abstraction layer L1 can be designed to transform the general control commands 15 into the camera-specific control commands 8. In other words, the camera abstraction layer L1 receives the general control commands 15, regardless of the kind of the individual camera units 3, and converts the general control command 15 designed for the respective camera units 3 by a predetermined converting method 19 into the camera-specific control commands 8. This affords the benefit that the respective adaptation algorithms 16 can put out general control commands 15 which can be independent of the type of the respective camera unit 3.

The adaptation layer L2 can contain various adaptation algorithms 16 which can perform respective adaptations of the recorded images 13 to respective image settings 9, 10. The respective adaptation algorithm 17 can depend on the camera unit 3 and/or the selected evaluation algorithm 12.

The selected evaluation algorithm 11 can be chosen from multiple evaluation algorithms 13 of an evaluation layer L3 and it can be designed, for example, to detect a head position or a movement in recorded images 13. It may also be possible during the evaluation for camera-specific result data 14 to depend on the respective camera unit 3. It can be provided that the camera-specific result data 14 must be transmitted in a predetermined format as general result data 21 to the data fusion device 22. In order that no adaptation is necessary in the individual evaluation algorithms 12, a generalization layer L4 can be arranged between the evaluation layer L3 of the evaluation algorithms 12 and a data fusion layer L5 of the data fusion device 22, which can be adapted to convert the camera-specific result data 14 by the predetermined generalization method 20 into general result data 21 and provide this to the data fusion device 22.

It can be provided that the general result data 21 in the data fusion layer L5 are transferred to a data fusion device 22 in order to carry out the predetermined data fusion method 23.

The control device 5 of the vehicle interior monitoring system 2 in the vehicle 1 can be adapted by software configuration to the camera units 3 situated in the vehicle interior. For this, each of the camera units 3 reports to the control device 5 the camera parameters 7, 25 which are relevant for the evaluation of the images 13 of the respective camera unit 3 in order to produce camera-specific result data 14. The camera parameters 7, 25 may include technically unchangeable camera parameters 7 such as a vertical and horizontal visual field, a resolution, the number of images 13 provided per second, the position in the vehicle interior, and the RGB/IR capability. The camera parameters 7, 25 can also include adjustable camera parameters 7 such as the number of lighting levels and an adjustable cropped image.

The vehicle interior monitoring system 2 has camera configurations 18 of the available camera units 3. The camera units 3 can comprise a camera unit 3 aimed at the driver, a centrally oriented camera unit 3, as well as other camera units 3. The camera configurations 18 describe the capabilities and properties of the respective camera units 3. In this way, the control device 5 is adapted to decide, based on the camera configurations 18, which evaluation algorithms 12 to use for the images 13 coming from the respective camera units 3. The camera configurations 18 can specify which weighting values 27 should be assigned to the general result data 21 of the respective camera units 3 during a data fusion. The camera configurations 18 can specify how the camera-specific result data 14 will be translated into general result data 21.

The vehicle interior monitoring system 2 provides a software architecture comprising adaptation layers between the camera units 3 and the data fusion device 22.

The camera hardware abstraction layer is an interface between the software modules for the adaptation algorithms and the respective camera drivers 6. Its mission is to convert the general control commands 15 provided by the software modules for the adaptation algorithms 16, 17 into the camera-specific control commands 8 demanded by the camera drivers 6 according to the camera configuration 18 of the respective camera unit 3 by a predetermined converting method 19.

The adaptation layer contains the software module of the adaptation algorithms, which has the mission of adapting the adjustable camera parameters 7 of the respective camera units 3 by way of the general control commands 15 in order to optimize the image 13 for the computer image processing according to the image settings 9, 10 of the selected evaluation algorithm 12. The implementation of the software module of the adaptation algorithms 16, 17 in order to put out the general control commands 15 which are independent of the respective camera units 3 and the camera drivers 6 makes possible a standardized measure of control over the different options provided by different camera drivers 6. Because the general control commands 15 are independent of the respective camera units 3 and the camera drivers 6, it is not required to adapt the adaptation algorithms 16, 17 to the respective camera units 3 and the camera drivers 6. For example, the adjustable camera parameters 7 can be changed by the general control commands 15 for adaptation of the lighting or for calibration. This makes it possible to change the camera unit 3 and/or the camera driver 6, while the ability of the adaptation algorithms 16, 17 to adapt the adjustable camera parameters 7 of the respective camera units 3 is preserved. The adjustment to the respective camera units 3 and the camera drivers 6 is done by the conversion algorithms of the camera hardware abstraction layer, which convert the general control commands 15 according to the respective camera configuration 18 into the respective camera-specific control commands 8.

The evaluation algorithms 11, 12 evaluate the image 13 received from the camera units 3 and put out for example a head position of the driver or an open eye status of the driver as camera-specific result data 14. Depending on the established technical camera parameters 7, 25 of the camera units 3, the monitoring system decides which of the evaluation algorithms 11, 12 should be used as the selected evaluation algorithm 11 for evaluation of the respective image 13 and which weighting value 27 should be assigned to the general result data 21 of the respective camera unit 3 for the data fusion method 23 performed by the data fusion device 22.

The adaptation layer is an interface between the evaluation layer and the fusion layer. Its mission is to translate the camera-specific result data 14 into the general result data 21 in order to allow an interpretation of the result of the evaluation algorithm 11 not depending on the camera parameters 7, 25 of the respective camera unit 3.

Figure 4:
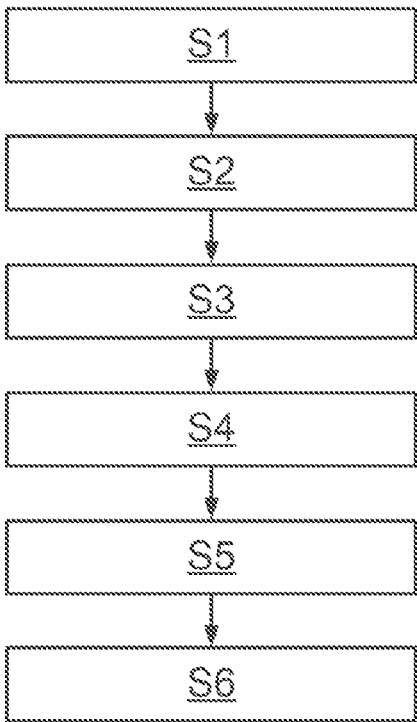
FIG. 4 shows a schematic representation of one sequence of a method for operating a vehicle interior monitoring system.

FIG. 4 shows a schematic representation of the sequence of a method for operating a vehicle interior monitoring system 2.

With the control device 5, the at least one general control command 15 can be generated S1 to set the adjustable camera parameter 7 of the camera unit 3 according to the image settings 9, 10 of the selected evaluation algorithm 12 by the predetermined adaptation algorithm 16, 17. The general control command 15 can be converted S2 into the camera-specific control command 8, 15 in dependence on the camera configuration 18 of the camera unit 3 as stored in the control device 5 by the predetermined converting method 19.

With the control device 5, the adjustable camera parameter 7 of the camera unit 3 can be set S3 by way of the at least one camera-specific control command 8 in the camera unit 3 in order to adapt an image recording for taking at least one picture 13 by the camera unit 3 according to image settings 9, 10 of a selected evaluation algorithm 12.

With the camera unit 3, the at least one image 13 is recorded S4 according to the at least one adjustable camera parameter 7 that was set and is sent to the control device 5.

With the control device 5, the at least one picture 13 taken by the camera unit 3 can be received and evaluated S5 according to the selected evaluation algorithm 12, and the result of the evaluation can be put out as a camera-specific result datum 14.

With the control device 5, the camera-specific result datum 14 can be converted into the general result datum 21 in dependence on the camera configuration 18 of the camera unit 3 stored in the control device 5 by the predetermined generalization method 20. With the control device 5, the general result datum 21 of the camera unit 3 can be provided S6 to a data fusion device 22.

Depending on the available room in the vehicle cockpit, the price segment in which the vehicle model is competing, the legislative enactments and standards for different geographical markets, the design principles adopted by a particular brand, the fact that new vehicle models will be developed in the next 10-15 years which follow the same architecture, although the optical and computer-supported technologies will continue to develop, and other factors of influence, the set of camera sensors must change constantly. The solution for increasing sensor variability is to develop a visual monitoring which can adapt to the available sensors and which describes the technical limits for the sensors, in order to remain compatible with the architecture.

On the whole, the examples show how a solution can be provided for an increasing sensor variability.

German patent application no. 102022113271.4, filed May 25, 2022, to which this application claims priority, is hereby incorporated herein by reference, in its entirety.

Aspects of the various embodiments described above can be combined to provide further embodiments. In general, in the following claims, the terms used should not be construed to limit the claims to the specific embodiments disclosed in the specification and the claims, but should be construed to include all possible embodiments along with the full scope of equivalents to which such claims are entitled.

The invention claimed is:

1. A method for operating a vehicle interior monitoring system including at least one camera unit, the method being performed by a control device and comprising:

setting an adjustable camera parameter of the at least one camera unit by way of at least one camera-specific control command that causes the at least one camera unit to adapt an image recording to record at least one image according to a plurality of image settings of a selected evaluation algorithm that detects movement of a driver of the vehicle and/or detects a viewing direction of the driver of the vehicle;

receiving the at least one image recorded by the at least one camera unit;

evaluating the at least one image recorded by the at least one camera unit according to the selected evaluation algorithm that detects movement of the driver of the vehicle and/or detects the viewing direction of the driver of the vehicle;

outputting a result of the evaluating as a camera-specific result datum;

generating at least one general control command that sets the adjustable camera parameter of the at least one camera unit according to the image settings of the selected evaluation algorithm by a predetermined adaptation algorithm;

converting the general control command based on at least one camera configuration of the at least one camera unit saved in the control device by a predetermined converting method into the camera-specific control command;

converting the camera-specific result datum based on the camera configuration of the at least one camera unit saved in the control device by a predetermined generalization method into a general result datum, wherein the general result datum includes coordinates referenced to a reference point in the vehicle interior, and wherein the coordinates referenced to the reference point in the vehicle interior are transformed from coordinates referenced to the at least one camera unit included in the camera-specific result datum; and providing the general result datum to a data fusion device.

2. The method according to claim 1, wherein the vehicle interior monitoring system includes at least two camera units.

3. The method according to claim 1, further comprising: selecting the selected evaluation algorithm based on the at least one camera configuration.

4. The method according to claim 1, wherein the vehicle interior monitoring system includes at least two camera units, and wherein respective general result data of the at least two camera units are combined by the data fusion device according to a predetermined data fusion method to form one fusion datum.

5. The method according to claim 1, further comprising: retrieving at least one camera parameter of the at least one camera unit from the at least one camera unit; and storing the at least one camera parameter in the at least one camera configuration.

6. The method according to claim 1, wherein the at least one camera configuration includes a position of a particular one of the at least one camera unit in the vehicle interior monitoring system.

7. The method according to claim 1, wherein the vehicle interior monitoring system includes at least two camera units, and wherein the method further comprises:

assigning respective weighting values to respective general result data of the at least two camera units based on respective camera configurations; and providing the respective weighting values together with the respective general result data to the data fusion device, wherein the respective general result data are combined based on the respective weighting values by the data fusion device according to a predetermined data fusion method to form one fusion datum.

8. A control device for a vehicle interior monitoring system, the control device comprising:

at least one processor; and a memory storing program code which, when executed by the at least one processor, causes the control device to:

set an adjustable camera parameter of at least one camera unit of the vehicle interior monitoring system by way of at least one camera-specific control command that causes the at least one camera unit to adapt an image recording to record at least one image according to a plurality of image settings of a selected evaluation algorithm that detects movement of a driver of the vehicle and/or detects a viewing direction of the driver of the vehicle, receive the at least one image recorded by the at least one camera unit, evaluate the at least one image recorded by the at least one camera unit according to the selected evaluation algorithm that detects movement of the driver of the vehicle and/or detects the viewing direction of the driver of the vehicle, output an evaluation result as a camera-specific result datum, generate at least one general control command that sets the adjustable camera parameter of the at least one camera unit according to the image settings of the selected evaluation algorithm by a predetermined adaptation algorithm, convert the general control command based on at least one camera configuration of the at least one camera unit stored in the control device into the camera-specific control command by a predetermined converting method, convert the camera-specific result datum based on the at least one camera configuration of the at least one camera unit stored in the control device to a general result datum by a predetermined generalization method, wherein the general result datum includes coordinates referenced to a reference point in the vehicle interior, and wherein the coordinates referenced to the reference point in the vehicle interior are transformed from coordinates referenced to the at least one camera unit included in the camera-specific result datum, and provide the general result datum to a data fusion device.

9. The control device according to claim 8, further comprising the vehicle interior monitoring system.

10. The control device according to claim 9, further comprising a vehicle.

* * * * *